(12) United States Patent
Moreau et al.

(10) Patent No.: US 7,798,381 B2
(45) Date of Patent: Sep. 21, 2010

(54) COLLAPSIBLE ROOF BASKET CARRIER

(75) Inventors: Serge Moreau, Newmarket (CA);
Robert Virtu, Markham (CA)

(73) Assignee: Salflex Polymers Ltd., Weston, Ontario (CA)

(*) Notice: Subject to any disclaimer, the term of this patent is extended or adjusted under 35 U.S.C. 154(b) by 221 days.

(21) Appl. No.: 11/976,591

(22) Filed: Oct. 25, 2007

(65) Prior Publication Data
US 2008/0149675 A1    Jun. 26, 2008

Related U.S. Application Data

(60) Provisional application No. 60/853,988, filed on Oct. 25, 2006.

(51) Int. Cl.
*B60R 9/04* (2006.01)

(52) U.S. Cl. .................. 224/314; 224/309; 224/316; 224/321

(58) Field of Classification Search .......... 224/309, 224/314, 316, 321, 325, 549; 220/4.28, 4.336, 220/7, 9.2, 9.3, 485, 489, 628, 632, 666, 220/810, 836; 403/166, 325; 248/220.21, 248/214, 37
See application file for complete search history.

(56) References Cited

U.S. PATENT DOCUMENTS

| | | | |
|---|---|---|---|
| 3,002,664 A | | 10/1961 | Guevara |
| 3,232,502 A | * | 2/1966 | Kleinbortas ................ 224/487 |
| 3,901,422 A | * | 8/1975 | Anderson et al. ........... 224/320 |
| 4,632,289 A | * | 12/1986 | Morissette ................. 224/314 |
| 4,747,529 A | | 5/1988 | Hinderaker et al. |
| 5,038,988 A | | 8/1991 | Thulin |
| 5,538,169 A | | 7/1996 | Moore |
| 5,634,408 A | * | 6/1997 | Jarkowski .................... 108/44 |
| 6,561,397 B1 | * | 5/2003 | Bauer et al. ................. 224/316 |
| 6,758,380 B1 | * | 7/2004 | Kolda .......................... 224/315 |
| 6,772,926 B2 | | 8/2004 | Eichele et al. |
| 6,845,892 B2 | * | 1/2005 | Henderson ................. 224/316 |
| 7,011,239 B2 | | 3/2006 | Williams |
| 7,246,733 B2 | | 7/2007 | Threet et al. |
| 2002/0030074 A1 | | 3/2002 | Bove et al. |
| 2002/0162869 A1 | * | 11/2002 | Blair .......................... 224/404 |
| 2004/0188478 A1 | | 9/2004 | Williams |
| 2006/0032878 A1 | * | 2/2006 | Settelmayer et al. ....... 224/319 |
| 2006/0180622 A1 | | 8/2006 | Dexter |

* cited by examiner

*Primary Examiner*—Nathan J Newhouse
*Assistant Examiner*—Adam Waggenspack
(74) *Attorney, Agent, or Firm*—Bereskin & Parr LLP/S.E.N.C.R.L., s.r.l

(57) ABSTRACT

A load carrying basket for attachment to a vehicle roof is movable between a deployed position and a stowed position. The stowed position facilitates entry of the vehicle into garages, parking lots and the like, having limited overhead clearance. The load carrier includes a plurality of pivotally mounted support members which are pivotally attached to an upper frame and a lower frame. At least one of the support members is a clamping member to clamp the carrier in the deployed position. Advantageously, the clamping member also clamps the load carrier in the stowed position.

13 Claims, 9 Drawing Sheets

COLLAPSIBLE ROOF BASKET CARRIER

FIELD OF THE INVENTION

This invention relates to the field of carriers mounted on the roof of a vehicle. In particular, this invention relates to the field of open basket carriers mounted on a vehicle roof.

BACKGROUND OF THE INVENTION

Typically many vehicles on the road today involve a roof rack system. Generally speaking, the roof rack system involves a pair of longitudinal rails extending aft from aft of the windshield along the roof. Although not necessarily permanently mounted to the longitudinal rails, there are often a plurality of transverse rails extending across the vehicle roof. When it is desired to carry a load on the roof of a vehicle, the load itself may be secured to the roof rack system. Alternatively, it may be possible to secure a carrier basket to the roof rack system of the vehicle. Roof rack systems of the type discussed above typically are installed on vehicles some times referred to as station wagons, and also on mini vans, SUVS or pick-up trucks. Generally speaking, such systems are installed on vehicles that have relatively elongate roofs extending over the vehicle cargo area. However, this invention is not limited to those types of vehicles as the invention may be applied to a more typical passenger car having a roof having a shorter longitudinal extent. The invention is also applicable to other roof rack systems such as those having a plurality of mounting pads on the vehicle roof.

Generally speaking when loads are carried on the roof, it is desirable to give the carrier as large a volumetric capacity as possible so as to enhance the load carrying capacity of the vehicle. Given this desirability, a load carrier is desirably as large as possible to accommodate the loads. However, a problem may then exist in that if the vehicle is to be parked in any kind of a height limited parking space whether a garage or other similar space, the height added to the vehicle by the load carrier basket may be detrimental to access by the vehicle. Accordingly, in order to handle this problem, systems have been developed to provide a collapsible carrier that is movable between a deployed, in use position and a folded, storage position.

Typical of prior art patents showing such systems, is U.S. Pat. No. 3,901,422 issued Aug. 26, 1975. In that patent entitled Folding Car Top Carrier, the device appears to move between a load carrying position and a folded position by use of a number of sliding, telescopically arranged tubular members.

It would be desirable to have a basket which is movable between a load carrying position and a storage position which does not make use of telescopic sliding tubular members. Such telescopic sliding tubular members may be subject to failure as a result of debris being deposited in the sliding tubular connection as the vehicle is driven.

SUMMARY OF THE INVENTION

In accordance with the present invention, the invention comprises a load carrier for use with a vehicle having a vehicle roof. The load carrier is adapted for mounting to the exterior of the vehicle roof. The load carrier is movable between a stowed position and a deployed position. The load carrier has a load floor, a bottom frame and a top frame. The top frame has left and right sides and front and back sides. The bottom frame has left and right sides and front and back sides. The load carrier has a plurality of support members. The support members have first and second ends. The first ends of the support members are pivotally connected to a bottom frame side and the second ends of the support members are pivotally connected to a corresponding top frame side and at least one of the support members includes a clamping member.

The load carrier may include a front deflection wall. The front deflection wall may be adapted for relative pivotal movement between the front wall and the load floor.

In accordance with another aspect of the invention, the clamping members include clamping passages to clamp the top frame and the bottom frame both when in the deployed position and the stowed position.

BRIEF DESCRIPTION OF THE DRAWINGS

A better understanding of the invention may be obtained from reviewing the attached drawings which illustrate one embodiment in accordance with the invention, and in which.

DETAILED DESCRIPTION OF THE INVENTION

Figures 1, 2:
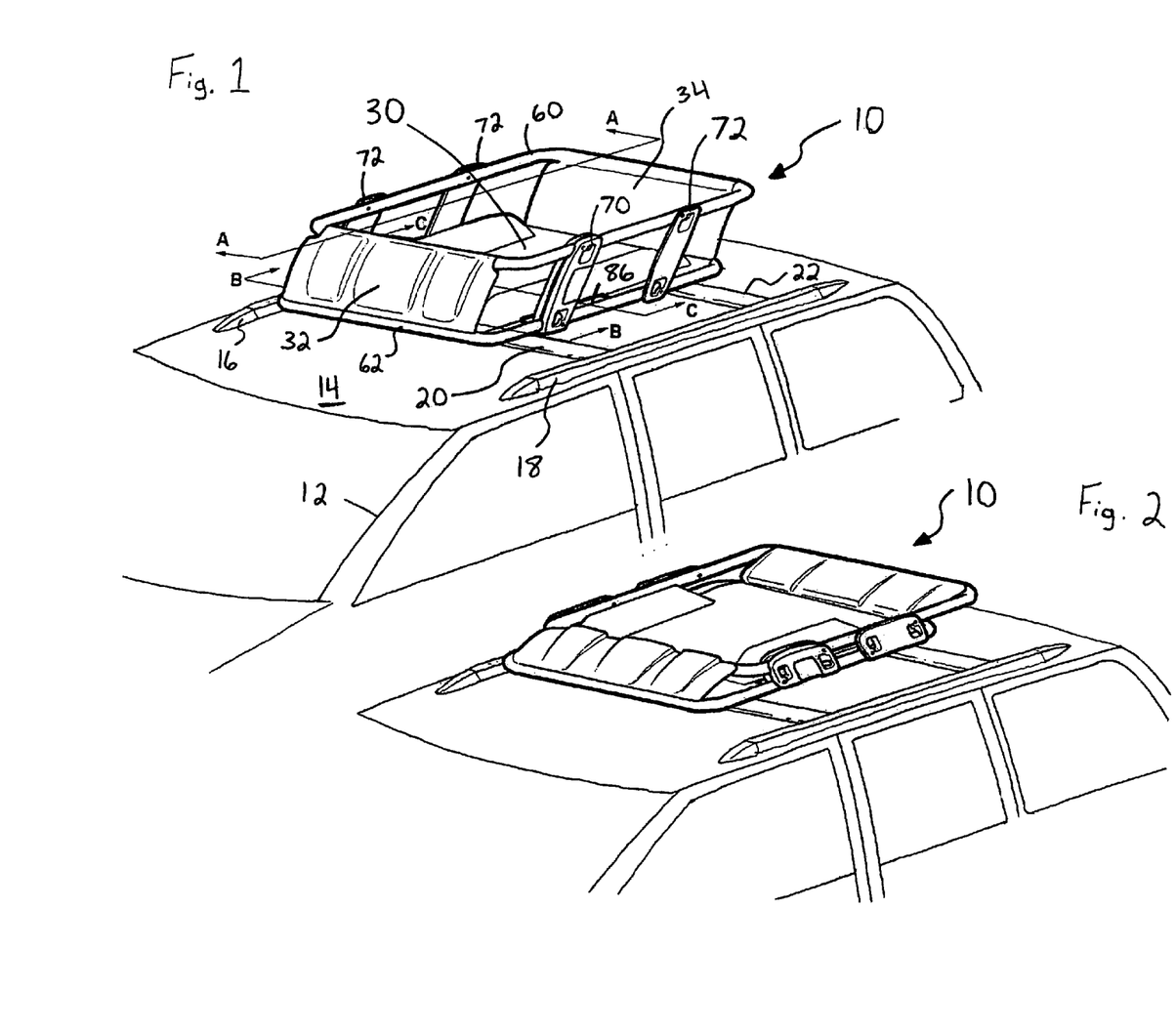
FIG. 1 is a perspective view of a vehicle having a carrier in accordance with the invention, showing the carrier in the deployed position.
FIG. 2 is a view similar to FIG. 1 showing the carrier of FIG. 1 in the stowed position.

With reference to FIG. 1, the carrier 10 is illustrated mounted on a vehicle 12. The vehicle 12 includes a vehicle roof 14. The vehicle roof 14 is fitted with a pair of longitudinally extending load rails 16 and 18. Mounted to the longitudinal load carrying rails 16 and 18 there are a plurality of cross members 20 and 22. The load carrier 10 is attached to and supported by the cross members 20 and 22.

FIG. 2 shows the same components of FIG. 1 but in the stowed position.

Further, with respect to FIG. 1, the carrier 10 includes a load floor 30. The carrier 10 also includes a front deflector wall 32 and advantageously, a rear wall 34. From reference to FIG. 3, in this particular embodiment, the load floor 30, the front deflector wall 32 and the rear wall 34 may all be made from a single component. Advantageously, this is a thermoformed component. The thickness of the material and the configuration of the material is selected such that there is a front living hinge 36 between the front wall 32 and the load floor 30. There is a second living hinge 38 between the rear wall 34 and the load floor 30. Accordingly, the front wall 32 and the rear wall 34 may deflect about the living hinges 36 and 38 respectively when the load carrier is moved between the deployed configuration and the stowed configuration.

Figure 3:
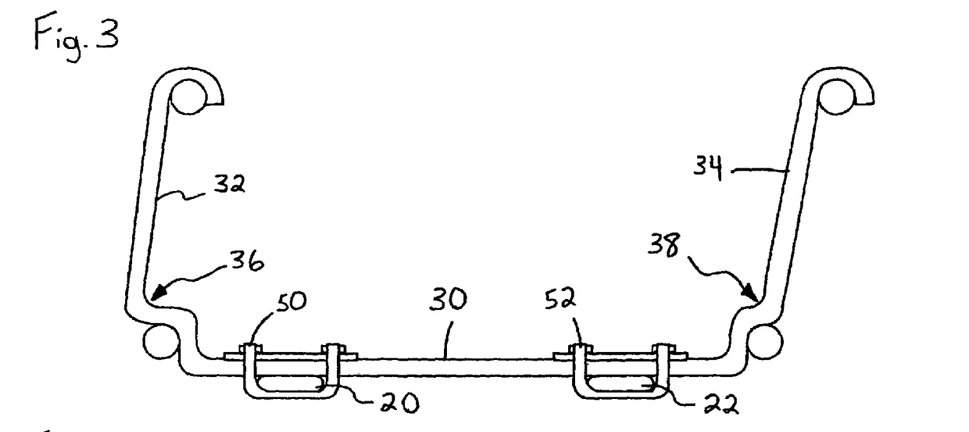
FIG. 3 is a planar sectional view along section line A-A of FIG. 1.
Figure 16:
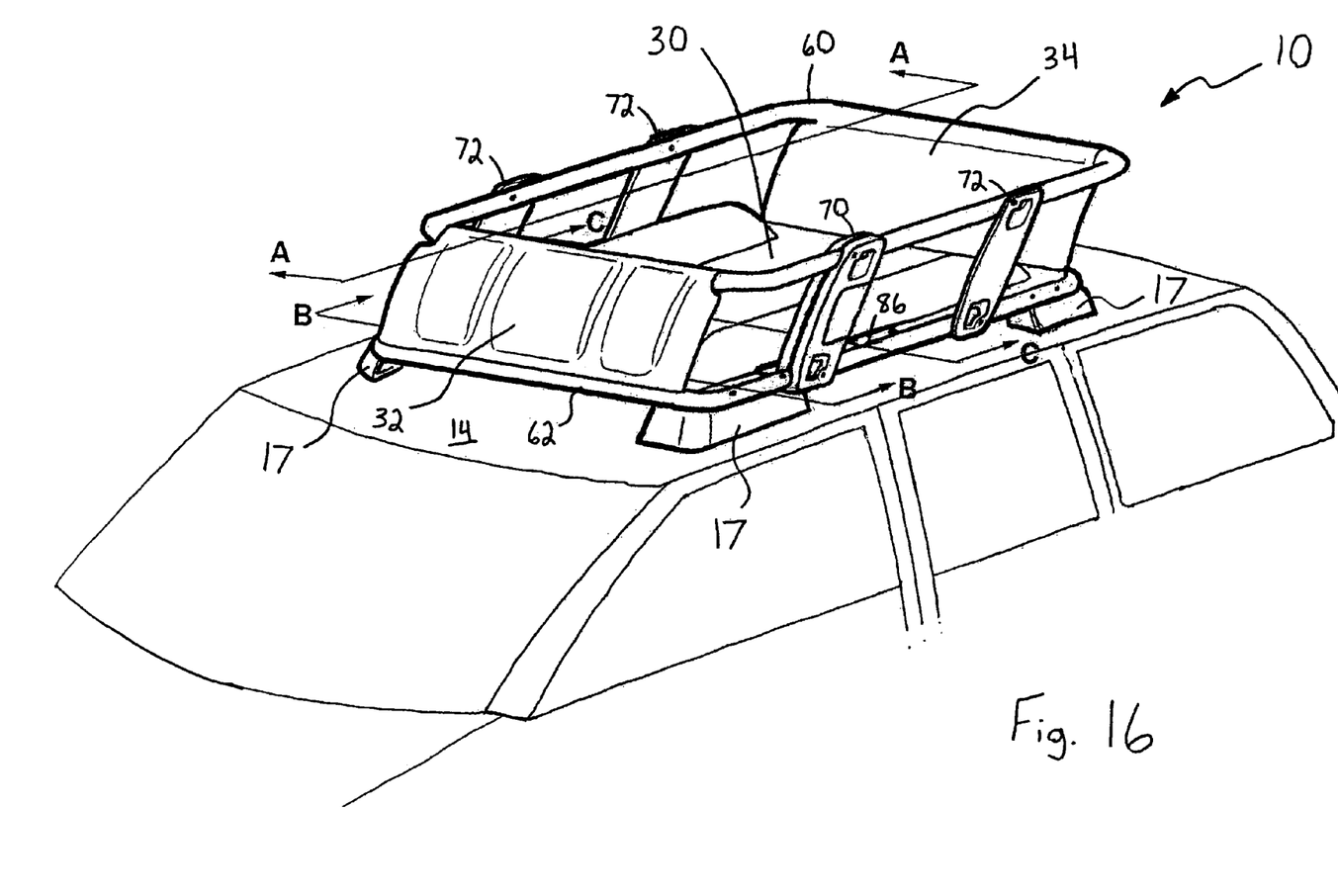
FIG. 16 is a perspective view similar to FIG. 1 but showing an alternative mounting embodiment.

As shown in FIG. 3, the load floor 30 of the carrier 10 is affixed to the vehicle by mounting clamps 50 and 52. The mounting clamps 50 and 52 respectively form a joint between the load carrier 10 and the vehicle cross members 20 and 22. An alternative mounting system is shown in FIG. 16. In that embodiment the carrier 10 includes mounting pads 17. The load carrier may be mounted to the mounting pads 17 and the mounting pads 17 in turn may be mounted directly to the vehicle roof. This system may be used when the vehicle does not have a pre-existing roof rack system.

With reference to FIG. 1, the load carrier 10 comprises an upper frame 60 and a lower frame 62. As shown in FIG. 1, the upper frame 60 is a generally rectangular shaped tubular member. While shown in FIG. 1 as a single member, the upper frame 60 can be made from a plurality of parts such as for instance two side members and front and rear members. The upper frame is advantageously a tubular component that may be either metallic or thermoformed plastic.

Similarly, the lower frame 62 as illustrated in FIG. 1 is a generally rectangular shaped tubular component. The lower frame may also have separate components, for instance left and right side members together with front and rear members. The lower frame may also be metallic or thermoformed. The lower frame 62 may be affixed to the front deflector wall 32 and the rear wall 34 by rivets. The upper frame may be "snap fit" into the front wall 32 and rear wall 34 as shown in FIG. 3. This will facilitate the necessary relative rotation on moving from the deployed position to the stowed position.

Further, with reference to FIG. 1, it will be noted that the carrier 10 includes a plurality of support members. Two such support members, 70 and 72 are illustrated on the vehicle left side. The support member 72 is a comparatively simple pivoting support which is pivotally connected to the upper frame 60 and the lower frame 62.

Support member 70 is a clamping member. The clamping member 70 as illustrated in the Figures serves to clamp the upper frame 60 with respect to the lower frame 62 so as to maintain the carrier 10 in the deployed position as shown in FIG. 1.

Figure 14:
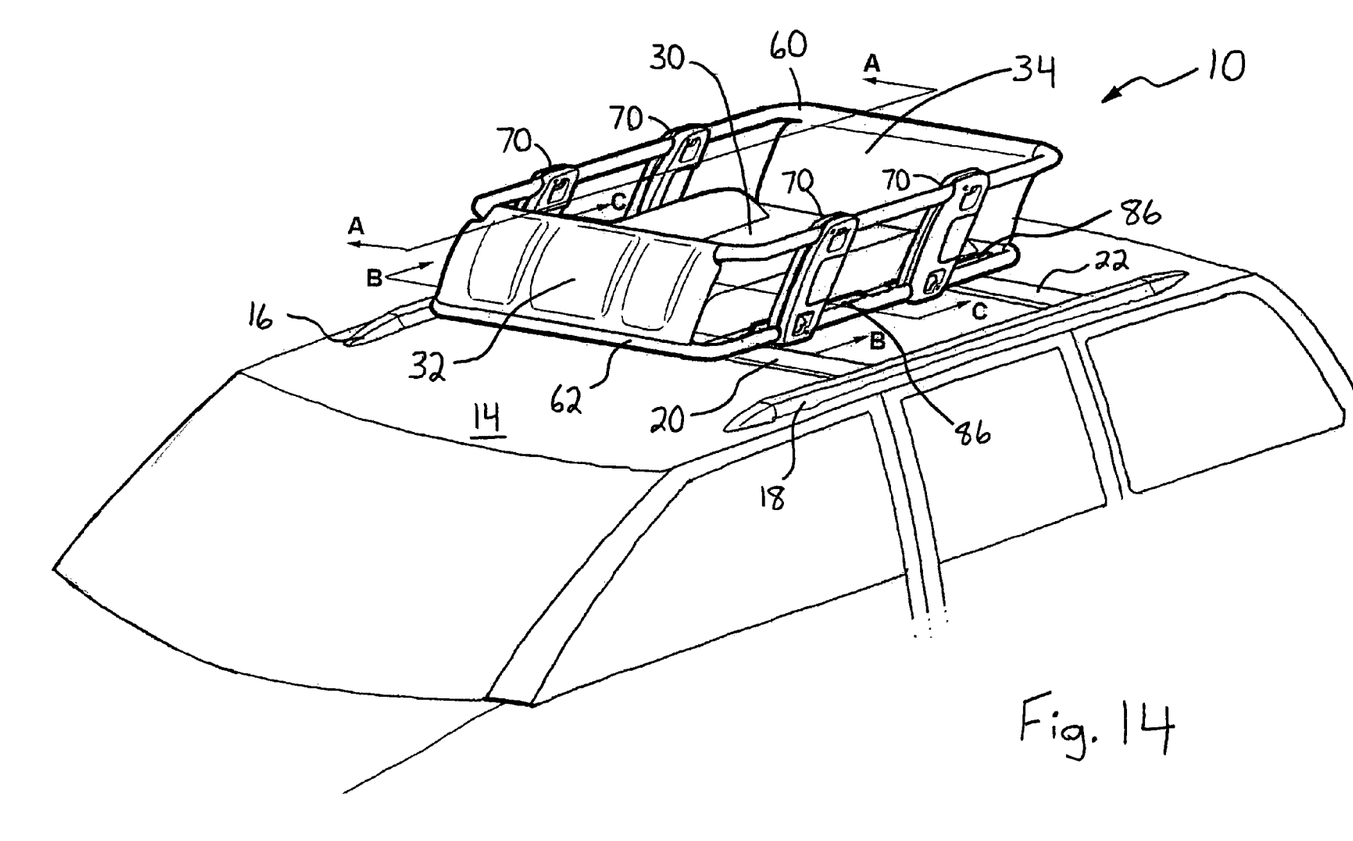
FIG. 14 is a view similar to FIG. 1 but illustrating a second embodiment in accordance with the invention.
Figure 15:
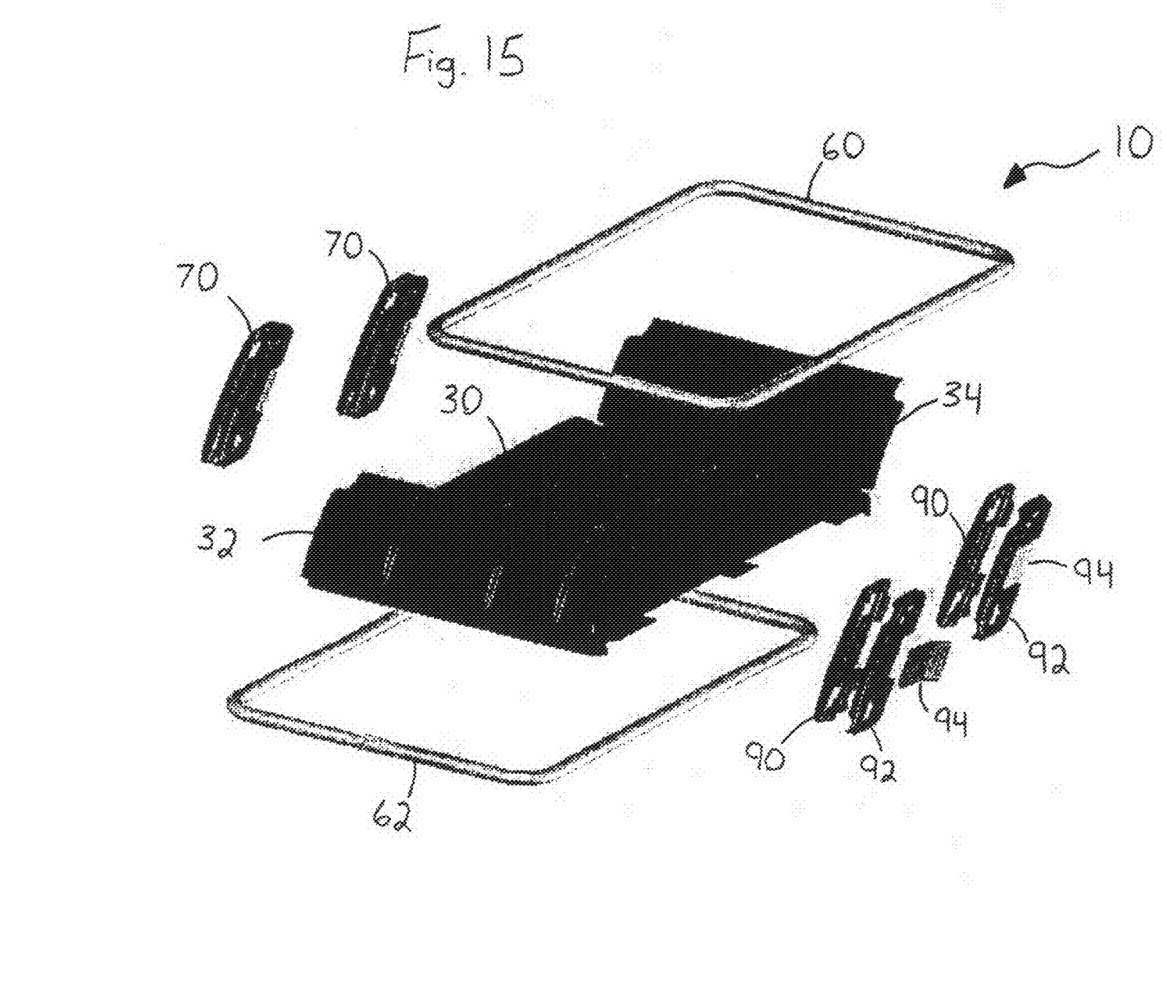
FIG. 15 is an exploded view of the load carrier of FIG. 14.

Advantageously, the carrier 10 includes at least one clamping member 70. However, if desired, the carrier 10 can include two clamping members 70, one on each of the left and right sides of the carrier. Even more advantageously, a plurality of clamping members 70 may be deployed on each side of the carrier 10. A perspective view of a vehicle having a plurality of such clamping members is illustrated in FIGS. 14 and 15.

Figure 4:
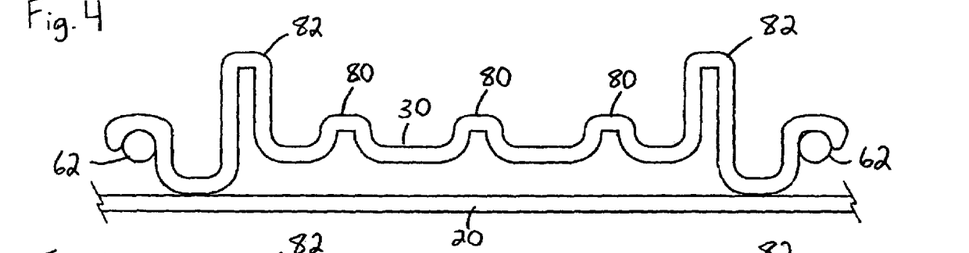
FIG. 4 is a planar sectional view along section line B-B of FIG. 1.

As shown in FIG. 4, the carrier 10 advantageously has a load floor 30. The load floor 30 is preferably manufactured from a thermoforming process applied to a plastic resin. The particular resin chosen may be any of the available resins. To provide strength to the load floor 30, advantageously, the load floor 30 includes a plurality of longitudinally extending stiffening ribs 80. Also advantageously, the load floor 30 comprises a pair of longitudinally extending side ribs 82. The side ribs 82 provide a structural function providing strength to the floor and also add a retainer function to support loads carried within the load carrier in the lateral direction. Height of the structural ribs 82 may be chosen as selected but should not be so high as to inhibit the desired configuration when in the stowed position as shown in FIG. 2.

Figure 5:
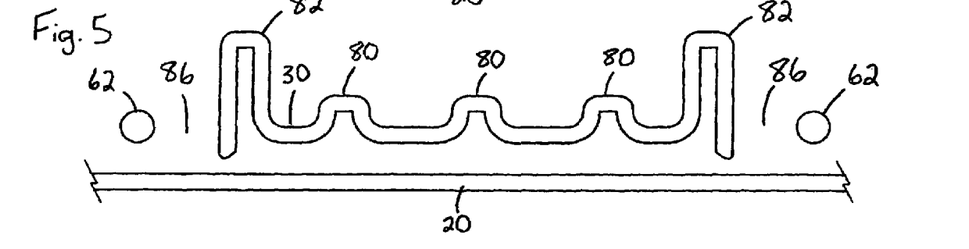
FIG. 5 is a planar sectional view along section line C-C of FIG. 1.

FIG. 5 illustrates a view similar to FIG. 4. However with reference to FIGS. 4 and 5, it will be noted, that the load floor 30 has a cut out or clearance space 86 at the location of the section line C-C. The clearance space 86 on either side provides clearance for the operation of the clamping members 70, as will be explained more fully below.

Figures 6, 7A, 8A:
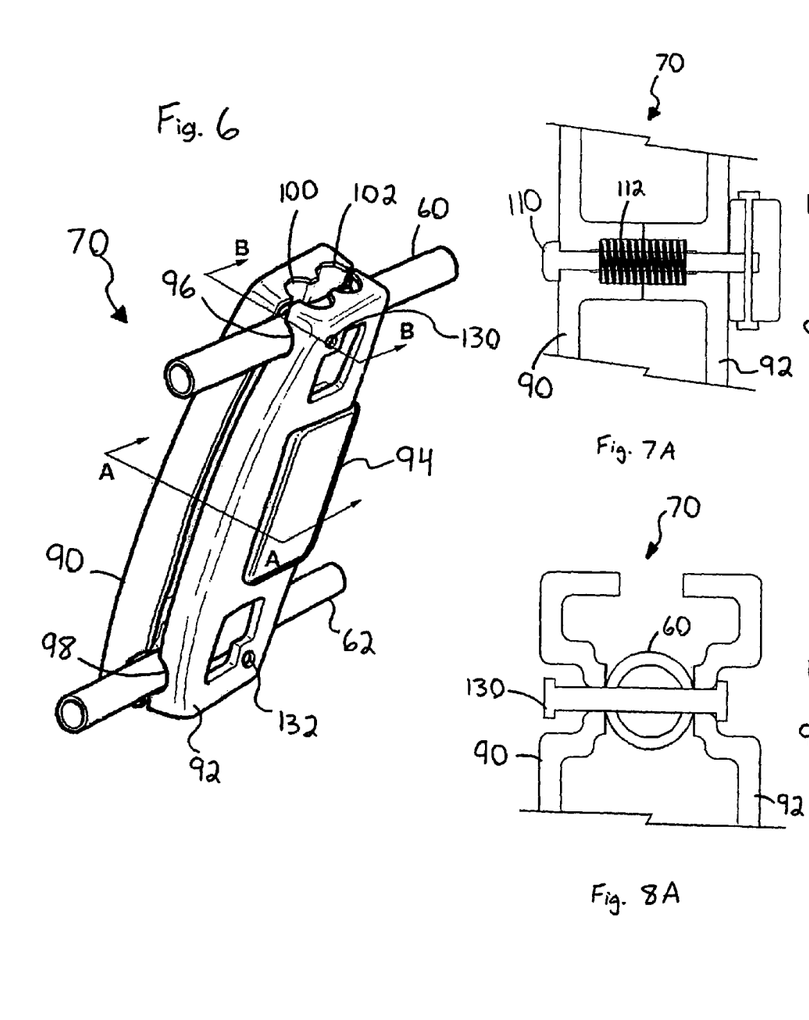
FIG. 6 is a perspective view of one of the components of the carrier of FIG. 1.
FIG. 7A is a sectional view along section line A-A of FIG. 6 showing the components in a closed configuration.
FIG. 8A is a sectional view along line B-B of FIG. 6 showing the components in a closed position.

The clamping member 70 is illustrated in perspective view in FIG. 6. The clamping member 70 comprises a pair of clamp halves 90 and 92. The clamping member 70 also includes a cam lever 94.

As shown in FIG. 6, the clamping member 70 is shown in the deployed condition as illustrated in FIG. 1. With the clamping member 70 in place, the upper frame 60 extends generally transversely through the clamping member 70. Similarly, the lower frame 62 extends generally transversely of the clamping member 70. The clamping member 70 includes a generally transversely extending passage 96 which accommodates the top frame 60 when in the configuration illustrated in FIG. 6. The clamping member 70 also includes a generally transversely extending passage 98 which accommodates lower frame member 62 when in the clamped deployed position. As illustrated in FIG. 6, the clamping member 70 also includes a first generally longitudinally extending passage 100 and a second generally longitudinally extending passage 102. The longitudinally extending passageway 100 accommodates the upper frame 60 when in the stowed position. The second longitudinally extending passage 102 accommodates the lower frame 62 when in the stowed position.

Figures 7B, 8B:
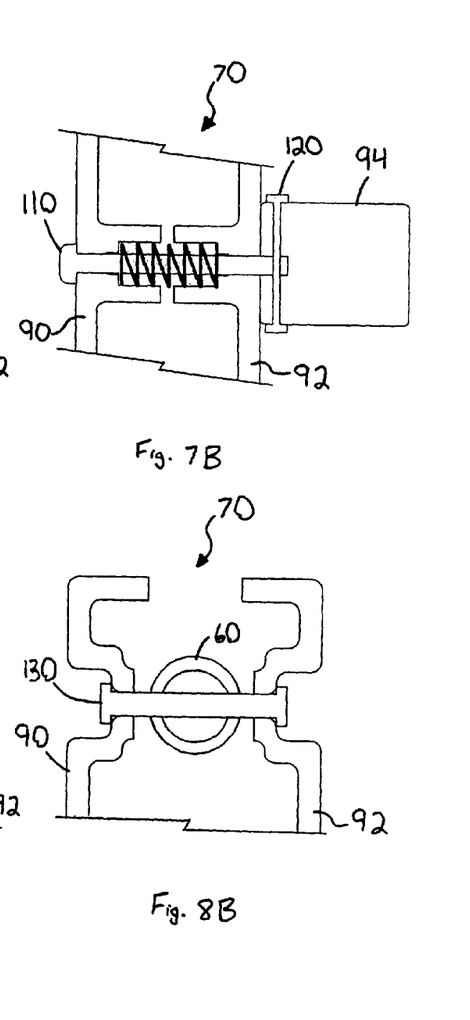
FIG. 7B is similar to FIG. 7A but showing the components in the open position.
FIG. 8B is similar to FIG. 8A showing the components in open position.
Figure 13A:
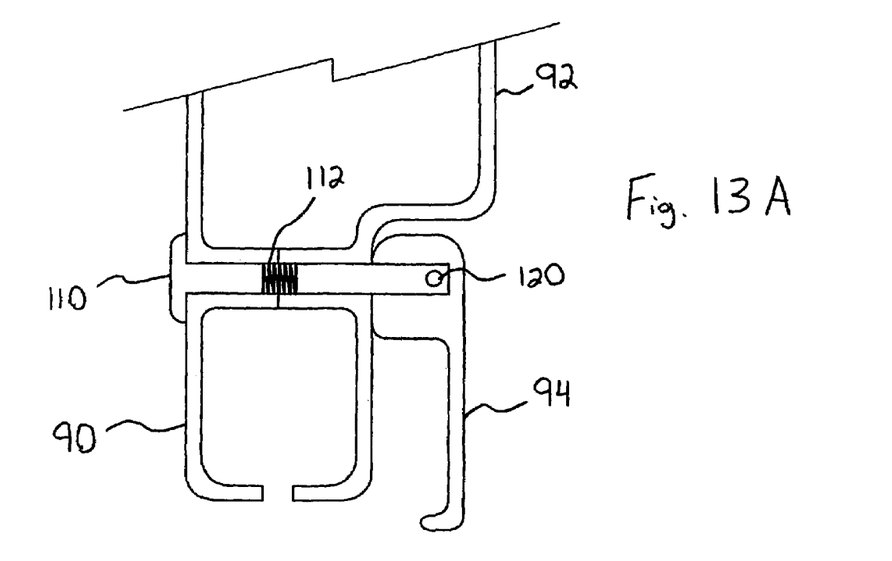
FIG. 13A is a partial top view of the components of FIG. 9 illustrating the components in the closed position.
Figure 13B:
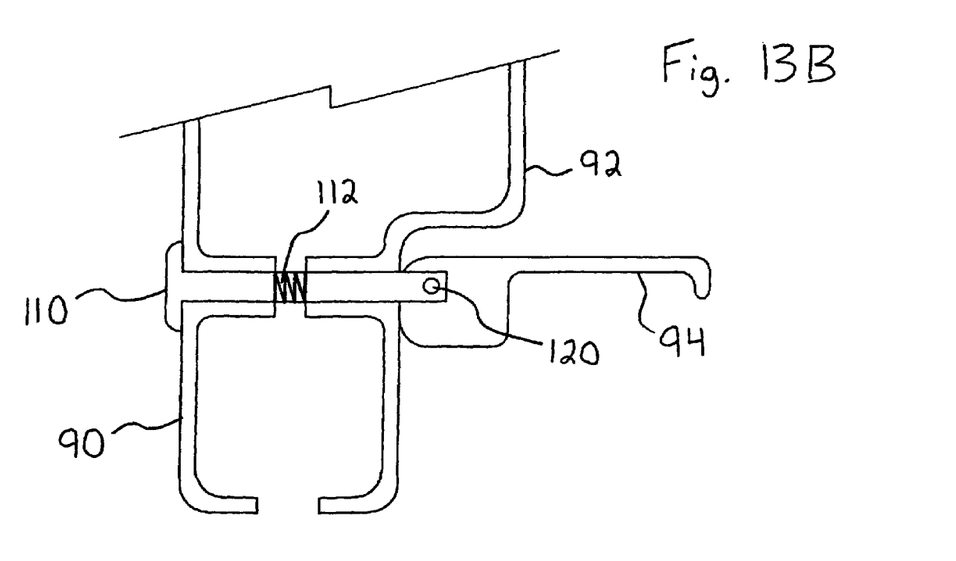
FIG. 13B is a view similar to FIG. 13A but showing the components in the open position.

In reference to FIGS. 7A, 7B, 8A and 8B, it will be noted that the clamping member 70 includes a generally horizontally extending pin 110. The pin 110 is fixed into clamp half 90 and extends through a boss to guide the movement of clamp half 92 with respect to clamp half 90. The clamping member 70 also includes a spring 112. The spring 112 is mounted axially, circumferentially around the pin 110 and is located within the mounting bosses of clamp halves 90 and 92 respectively. The spring is a compression spring and urges the clamp halves 90 and 92 into the open position as shown in FIG. 7B. The pin 110, is attached to the cam lever 94 by means of a hinge pin 120. Movement of the cam lever 94, effects relative movement of the clamp halves 90 and 92 toward and away from each other as shown in FIGS. 13A and 13B.

As shown in FIGS. 8A and 8B, the clamp halves 90 and 92 clamp about the upper frame member 60 when in the closed position, FIG. 8A, and release upper frame member 60 when in the open position as shown in FIG. 8B. The top frame member 60 is attached to the clamp halves 90 and 92 by a pin 130. While not illustrated in FIG. 8, the lower frame member 62 is also attached to the clamp halves 90 and 92 in a similar fashion by reason of a transversely extending pin 132. As shown in FIG. 6, the pins 130 and 132 are fore and aft offset from one another for purposes which will become apparent as set out below.

Figure 9:
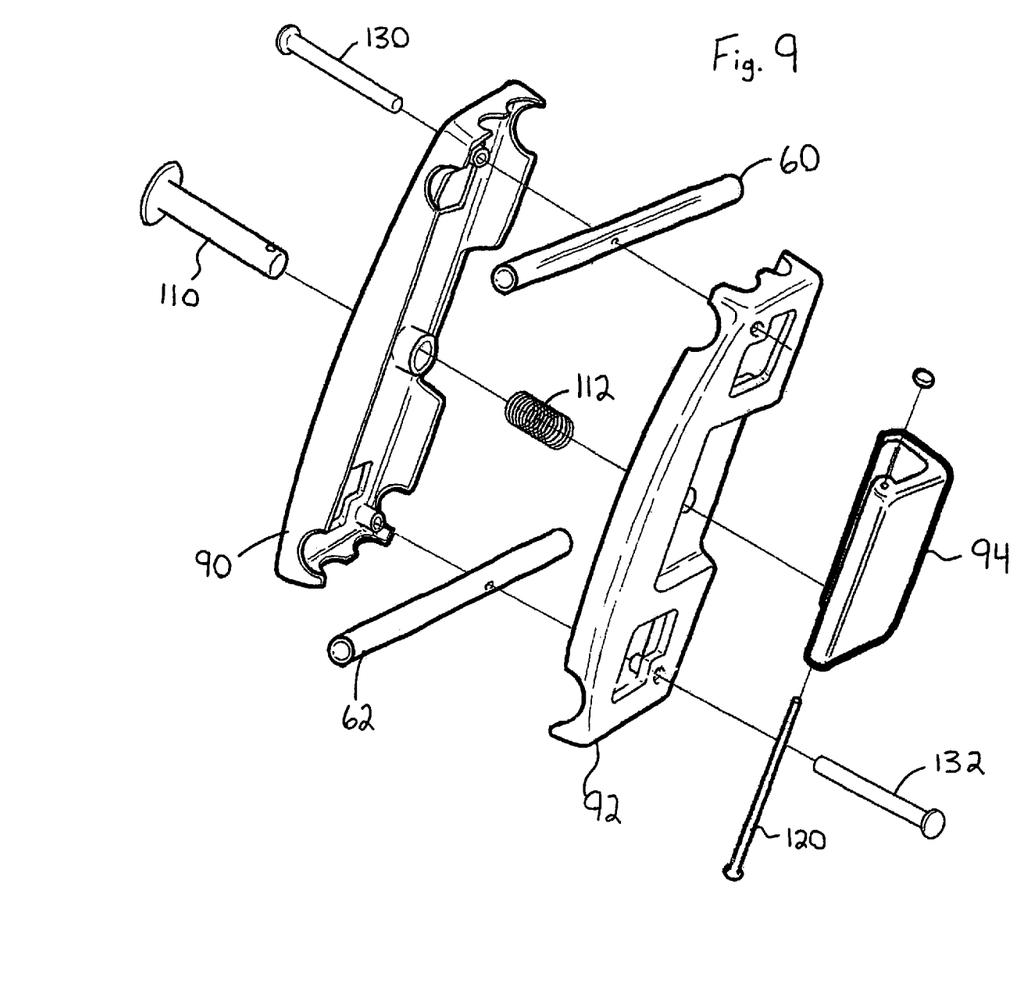
FIG. 9 is an exploded view of the components show in FIG. 6.

FIG. 9 illustrates in exploded fashion the components of the clamp in association with the upper frame 60 and the lower frame 62.

Figures 10, 11, 12A, 12B:
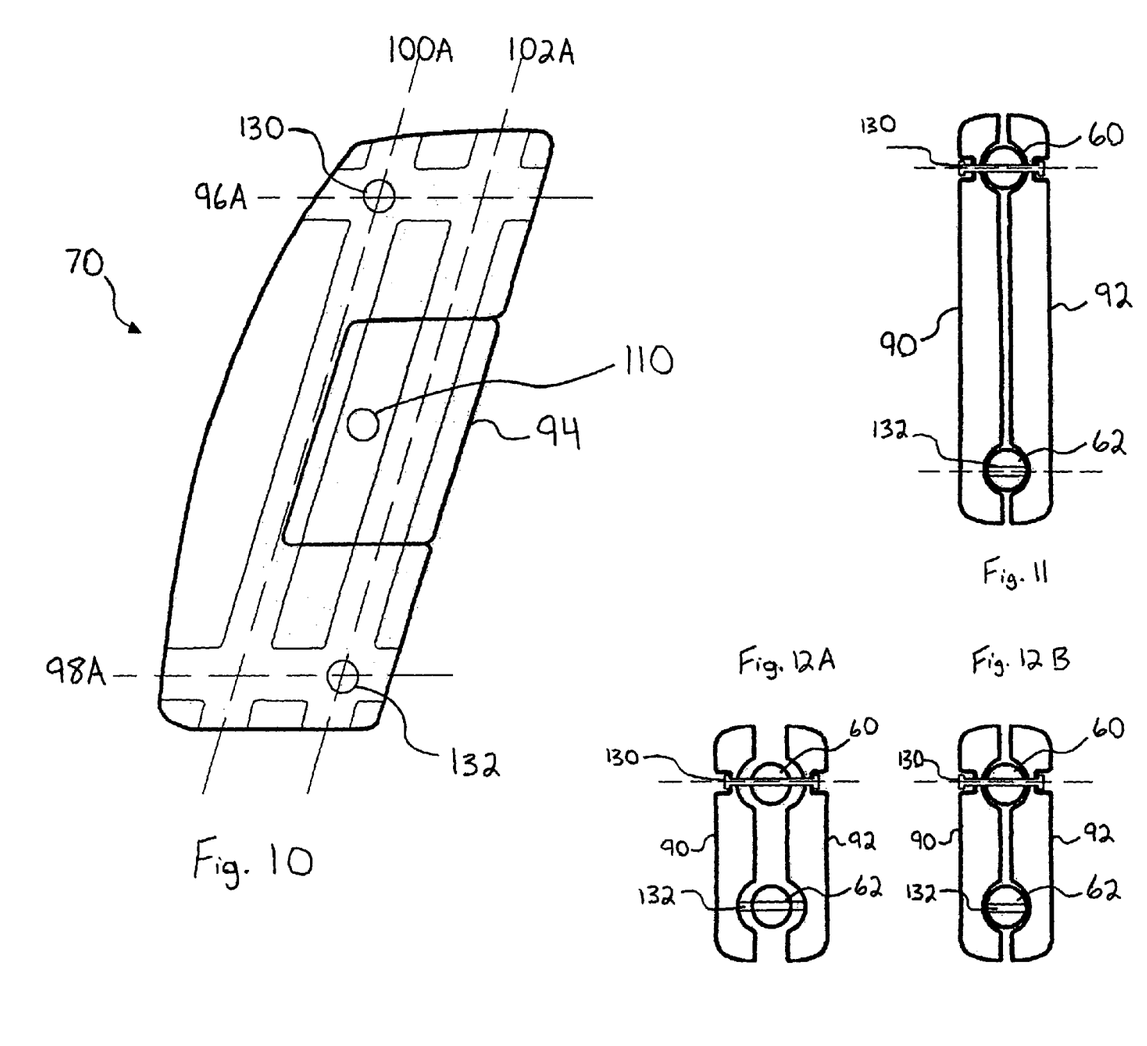
FIG. 10 is a phantom side elevational view of the components of FIG. 9 in the assembled configuration.
FIG. 11 is a front view of the components of FIG. 9 when in the assembled condition with the carrier being deployed.
FIG. 12A is a front view of the components of FIG. 9 when in the assembled condition, but when in the stowed position with the components open.
FIG. 12B is similar to FIG. 12A but showing the components in the closed position.

FIG. 10 illustrates the clamping member 70 in phantom side view with the clamping member 70 positioned so that the carrier would be in the deployed position. The axis of the transversely extending channel 96 is illustrated at 96A. The axis of the transverse channel 98 is illustrated at 98A. The longitudinally extending channel 100 has an axis shown at 100A. The longitudinally extending channel 102 has an axis 102A. With respect to FIG. 10, when it is desired clamp the carrier in the deployed position, the top frame 60 extends through the passageway 96 along the axis 96A while the lower frame 62 extends through the passageway 98 along the axis 98A. The support clamp is then moved to the closed position by means of the cam lever 94 thereby tightly capturing the upper frame and lower frame. This provides the necessary rigidity to maintain the load carrier in the deployed position as shown in FIG. 1. Also from review of FIG. 10, it will be noted that the axis of pin 130 is arranged to be transverse to the axes of both passageways 96 and 100. The pin 132 is arranged to be transverse to both the axes 98A and 102A. In each case the pins 130 and 132 are located at the intersection of their respective longitudinal and transverse axes. When it is desired to move the carrier to the stowed position as shown in FIG. 2, the cam lever 90 is moved to the position shown in FIGS. 7B and 13B. At that time the spring 112 separates the cam halves 90 and 92. With the cam halves in the separated condition, the clamping member 70 is free to rotate about the pins 130 and 132 respectively to move a clamping member 70 to a generally horizontal configuration as compared to the orientation shown in FIG. 10. At this time, the upper frame 60 will then lie along the passageway 100 while the lower frame 62 will lie along passageway 102. By operation of the cam lever 94 to the position as shown in FIG. 7A and FIG. 13A, the clamp halves 90 and 92 move together to tightly clamp the upper frame and lower frame in the stowed position.

The clamping member 70 may be made from any suitable material. The clamping member may be metallic. However, the clamping member advantageously, may be made from a resin material which can be molded through any convenient plastic molding process. Similarly, the cam lever may also be metallic or may be a thermal formed material manufactured in a suitable mold.

In order to operate the device, each of the cam levers are moved to the open position as shown in FIG. 13B. This may include cam levers on both the left and right hand sides of the vehicle. With all of the cam levers in the open position, the upper portion of the frame may be moved upwardly and forwardly pivoting around the pivotal connections of the support. When the support members have been pivoted to the generally vertical position, the clamping members may be moved to the position shown in FIG. 13A, that is the closed position on either side of the vehicle. The basket is then ready for utilization. Upon entering a garage or other limited height facility or circumstance, the cam levers may be opened after the load is removed and the storage basket returned to the stowed position.

While the device has been disclosed above and discussed in connection with a device having both an upper frame and a lower frame, it is possible that the tubular frame members are not in fact required. In this case, additional structure may be added to the load floor 30, the front wall 32 and the rear wall 34. In those cases, the support members may be pivotally attached directly to the uppermost portions of the front wall and rear wall and convenient portions of the load floor. As shown in FIGS. 1 and 5, the clamping member 70 may move in a pivotal range of motion with the inner clamp half 90 moving through the clearance slot 86.

Although the invention has been shown and described by reference to embodiments in accordance with the invention, the invention is not to be limited to these specific embodiments. Other variations and substantial differences may be apparent to those of ordinary skill in this art. All such variations and changes are considered to be within the scope of the invention as set out in the following claims.

The invention claimed is:

1. A load carrier for use with a vehicle having a vehicle roof;
    wherein:
        said load carrier is adapted for mounting to the exterior of said vehicle roof;
        said load carrier is movable between a stowed position when mounted on said vehicle and a deployed position when mounted on said vehicle;
        said load carrier including a load floor, a bottom frame and a top frame;
        said bottom frame and said top frame being generally parallel to one another in both the deployed position and the stowed position;
        said bottom frame having left and right sides and front and back sides;
        said top frame having left and right sides and front and back sides;
        said load carrier further comprising a plurality of support members;
        said support members having first and second ends;
        said first ends pivotally connected to a bottom frame side and said second ends pivotally connected to a corresponding top frame side
        and at least one of said support members comprises a clamping member for releasably clamping said load carrier to maintain said load carrier in said deployed position and for releasably clamping said load carrier to maintain said load carrier in said stowed position, and wherein said clamping member of said at least one support member comprises clamping passages to clamp said top frame and said bottom frame when in the deployed position and when in the stowed position.

2. The load carrier of claim 1 wherein said load carrier comprises a plurality of said clamping members.

3. The load carrier of claim 2 wherein the load carrier comprises a front, deflection wall.

4. The load carrier of claim 3 wherein said front wall is adapted for relative pivotal movement of said front wall relative to said load floor.

5. The load carrier of claim 4 wherein said carrier comprises a rear wall and said rear wall is adapted for pivotal movement of said rear wall relative to said load floor.

6. The load carrier of claim 5 wherein said front wall is connected to said load floor by means of a living hinge.

7. The load carrier of claim 6 wherein said rear wall is connected to said load floor by means of a living hinge.

8. The load floor of claim 7 wherein said load floor comprises a plurality of longitudinally extending structural ribs.

9. The load floor of claim 8 wherein said load floor comprises a plurality of side edge ribs for laterally supporting loads within said load carrier.

10. The load carrier of claim 9 wherein said load floor comprises a thermoplastic.

11. The load carrier of claim 1 wherein said load carrier comprises a plurality of mounting pads, said carrier is adapted to be mounted to said mounting pads and said mounting pads are adapted to be mounted directly to a vehicle roof.

12. The load carrier of claim 1 wherein said clamping member comprises a plurality of generally transversally extending clamping passageways and a plurality of generally longitudinally extending clamping passages.

13. The load carrier of claim 12 wherein said clamping member comprises first and second clamp halves, a spring for urging the clamp halves apart and a cam lever for holding the clamps halves in a closed position.

* * * * *